United States Patent [19]

Hansen et al.

[11] Patent Number: 4,719,474
[45] Date of Patent: Jan. 12, 1988

[54] APPARATUS FOR IMAGING TEXT AND GRAPHICS ON PHOTOSENSITIVE MATERIAL

[75] Inventors: Walter I. Hansen, Cold Spring Harbor; Herbert Klepper, Westbury, both of N.Y.

[73] Assignee: Rudolf Hell GmbH, Kiel, Fed. Rep. of Germany

[21] Appl. No.: 757,129

[22] Filed: Jul. 19, 1985

[51] Int. Cl.⁴ .............................................. G01D 9/42
[52] U.S. Cl. ........................................ 346/108; 354/5; 350/6.7
[58] Field of Search ............... 346/108, 107 R; 354/5, 354/277; 350/6.7, 6.9

[56] References Cited

U.S. PATENT DOCUMENTS

| | | | |
|---|---|---|---|
| 2,151,570 | 3/1939 | Shoults | 346/108 |
| 3,687,025 | 8/1972 | Rosin | 350/6.91 |
| 4,008,483 | 2/1977 | Swift | 354/277 |
| 4,034,929 | 7/1977 | Ebner | 354/277 |
| 4,154,507 | 5/1979 | Barr | 350/174 |
| 4,284,994 | 8/1981 | Radl . | |
| 4,404,570 | 9/1983 | Ohmishi | 346/108 |
| 4,482,225 | 11/1984 | Moyroud | 354/5 |
| 4,516,142 | 5/1985 | Yamamoto | 346/108 |

Primary Examiner—Clifford C. Shaw
Assistant Examiner—Mark Reinhart
Attorney, Agent, or Firm—Lawrence C. Edelman

[57] ABSTRACT

Image setting apparatus is disclosed for producing two-dimensional images on photosensitive sheet material. The apparatus includes a device for transporting the photosensitive sheet material past an image point to provide a first dimension of the two-dimensional image; a light source for producing a modulated beam of light, a scanning device for converting the light beam into a scanning beam; and a scan lens in the path of the scanning beam such that a focused beam spot moves repeatedly in a linear direction across the photosensitive material at the image point to provide the other dimension of the two-dimensional image. According to one improvement the scanning device is a rotatable prism having two mirror facets whose planes intersect in a common line. The prism is arranged to rotate about an axis perpendicular to this line so as to reflect the light beam into a scanning beam having a substantially constant angular velocity. According to another improvement, the device for transporting the photosensitive sheet material includes a pair of driving rollers at the nip of which the sheet material is pinched, the image point being located along a line on the surface of one of these rollers extending parallel to its axis of rotation.

17 Claims, 17 Drawing Figures

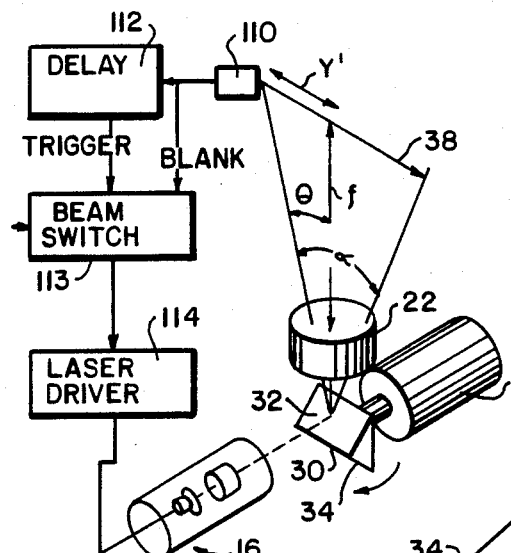
FIG.4
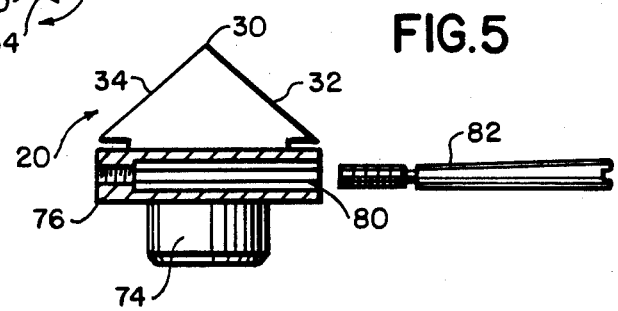
FIG.5
FIG.6
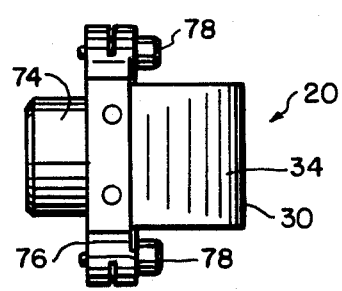
FIG.7
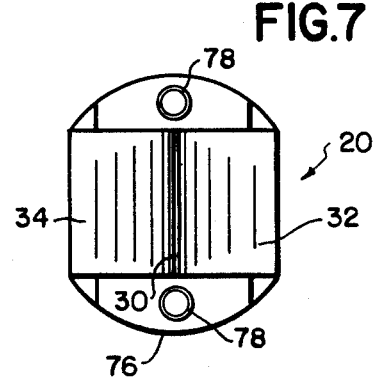
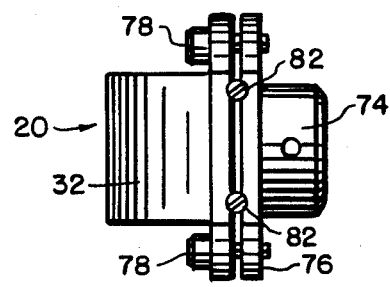
FIG.8

APPARATUS FOR IMAGING TEXT AND GRAPHICS ON PHOTOSENSITIVE MATERIAL

BACKGROUND OF THE INVENTION

1. Field of Invention

The present invention pertains to image setting and, more particularly, to an apparatus and method for providing high quality images on photosensitive material.

2. Background of Invention

To enable one skilled in the art to appreciate the context and the significance of the improvements involved in accordance with the present invention, reference may be made to the following background information, specifically to the following U.S. patents:

U.S. Pat. No. 3,687,025—Rosin
U.S. Pat. No. 4,284,994—Radl

From the references cited, it will be appreciated that a variety of printers, including those classified as dot matrix printers, have already been developed. Most of such printers have typical dot matrix resolutions of 100 dots per inch or less, although some of them apparently provide 300 dpi, which is considered high quality for printers. On the other hand, laser phototypesetters can provide writing resolutions between 720 and 2,500 dpi, with the bulk of them having resolutions lying in the range of 975 to 1,200 dpi.

Nevertheless, what has been lacking in the field is a cost-effective apparatus for achieving the requisite high degree of resolution in image setting.

It is therefore a primary object of the present invention to provide a low-cost, high-resolution, image setter for reproduction-quality imaging.

Another, more specific object is to facilitate the production of output images having widths equal to or greater than 72 picas (12 inches).

Another specific object is to set images at resolutions ranging up to 2,400 dpi and at a speed of over 170 rasters per second, which corresponds to one inch of output every seven seconds at 1,200 dpi. and proportionately shorter times at coarser resolutions.

It is well known that laser typesetters utilizing multi-faceted mirrors, in conjunction with a conventional optical system, require that each and every facet be corrected individually to match each other due to the practical limitations of facet manufacturing tolerances.

In this regard, particular reference may be made to the aforementioned U.S. Pat. No. 4,284,994. The invention described therein relates to laser beam recorders or printers using a polygonal mirror as a scanning device, the improvement being particularly directed to an optical system for compensating tilted facets of the polygonal mirror.

The U.S. Pat. No. 4,284,994 does generally set forth a scheme or system involving a laser beam containing input information, and including means for reflecting that beam through a scan lens system, a polygonal mirror functioning to produce a scan beam with constant angular velocity. The scan lens acts in response to the scan beam to provide an image point that moves across the film with a constant velocity. Concurrently or alternately with the movement of the scan beam, a mechanical scanner moves the film either continuously or in discrete steps, thereby to provide the other dimension of the requisite two-dimensional image.

Conventional laser typesetters have generally used gas lasers, such as helium-neon lasers, in their operation. Not only are such lasers, with their accompanying power supply, modulator and modulator driver relatively expensive, but the helium-neon laser, in particular, suffers from the fact that the peak modulation rate is limited by the size of the output beam. Only with further optics improvements, involving additional cost, can the modulation performance be improved.

In contrast thereto, currently available laser diodes in the milliwatt range can readily be modulated in an image setter at rates of at least 20 MHz. Accordingly, it is a primary object of the present invention to judiciously exploit, by a unique combination of apparatus, the capability of such laser diodes with high modulation rates.

Another more specific object is to achieve an efficient compromise between speed and alignment requirements in producing high quality images on photosensitive material.

Yet another specific object is to enable more efficient use of the laser light energy available by providing that the prism mirror involved in the optical arrangement achieves a relatively longer dwell time on the photosensitive material than conventional systems.

In previously known phototypesetters a serious drawback involved the structure of the apparatus for receiving the image and transporting the film. Frequently the prior art mechanisms for film transport involve a relatively long film path from the point at which the film is removed from a film supply cassette and moved past the optical system to the point at which it is rewound on an output reel or the like.

It is therefore another primary object of the present invention to eliminate the wastage in photosensitive material involved in the long path from input to output points.

SUMMARY OF THE INVENTION

In fulfillment of the above-stated objects, a primary feature of the present invention lies in a unique combination of phototypesetting apparatus, comprising a device for transporting a photosensitive sheet material past an image point to provide a first dimension of the required two-dimensional image on such material; a rotatable prism, having two mirror facets whose planes intersect in a common line and having an axis of rotation perpendicular to this line, for suitably reflecting from a source of modulated light a scan or sweep beam with constant angular velocity; and a scan lens in the path of the scan beam, such that a focused beam spot moves repeatedly in a linear direction across the photosensitive material, thereby to provide the other dimension of the two-dimensional image.

A specific feature of the invention resides in the fact that the source of light comprises a laser diode emitting a coherent light beam, such beam being modulated in response to an electrical signal representative of the image to be developed.

Another specific feature of the present invention resides in the mounting means for the particular prism mirror or "spinner" utilized in the optic system. Because there are two mirror facets involved in the device, only one degree of freedom adjustment is necessary. Accordingly, a simple adjusting means ensures that the beam from both facets will hit the photosensitive sheet material at the same place.

Another primary feature of the present invention relates to the unique film transport mechanism. The film is unwound from a suitable reel housed in a receptacle or cassette and the film is moved between drive rollers. It is then moved past a device for cutting the film and to an output receptacle where the film may be rolled up, if desired, by a suitable reel or may be left in an unwound state. By keeping the film path short from input to output, and particularly by writing directly on the film passing under one of the aforesaid drive rollers, a high degree of economy in photo material usage is effected.

A specific feature in connection with the film transport mechanism is an arrangement involving a stepping motor which drives through a worm gear and worm wheel so as to enable simple direct control of position from a suitable electronic control system. Such a worm gear arrangement contributes to stability, and the phototypesetting system can achieve precision without high tolerance manufacturing requirements or precision assembly requirements.

Other and further objects, advantages and features of the present invention will be understood by reference to the following specification in conjunction with the annexed drawings, wherein like parts have been given like numbers.

BRIEF DESCRIPTION OF THE DRAWINGS

FIG. 4 is a perspective view of some of the principal components of the system, particularly indicating the movement of an image point on a film plane responsive to light from a source as reflected by a mirror system through a lens means.

FIG. 5 is a fragmentary end view of the mirror or "spinner" in accordance with the present invention, particularly illustrating the adjustable mounting means for such mirror.

FIGS. 6, 7 and 8 are front view, top view, and rear view, respectively, of the adjusting arrangement for the mounting means illustrated in FIG. 5.

FIG. 11 is a detailed view showing the adjustable means for providing an aperture in the path of the lens of the system.

DESCRIPTION OF THE PREFERRED EMBODIMENT

Figure 1:
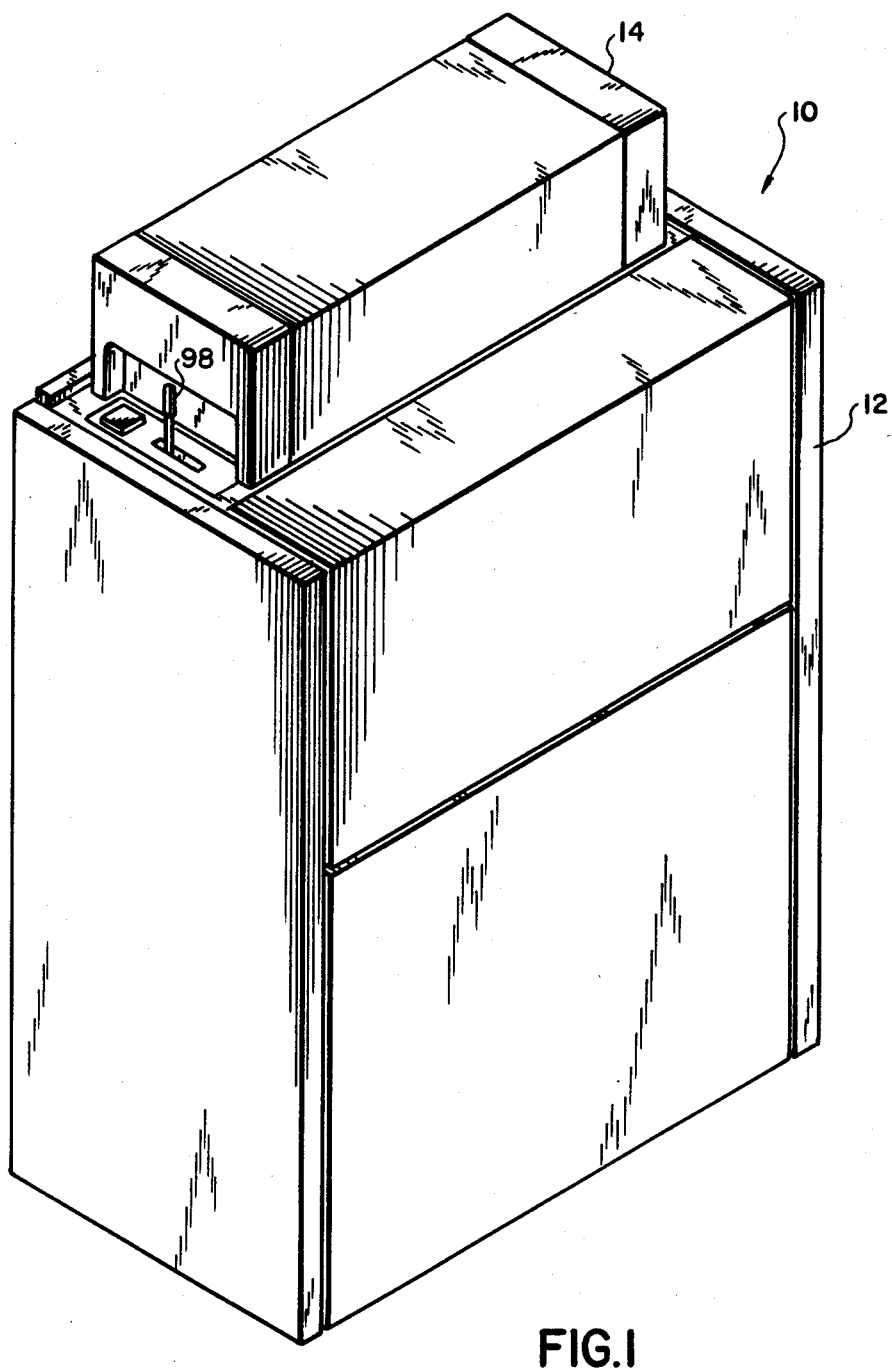
FIG. 1 is a perspective view of the complete apparatus including a housing in which the present invention is incorporated.
Figure 3:
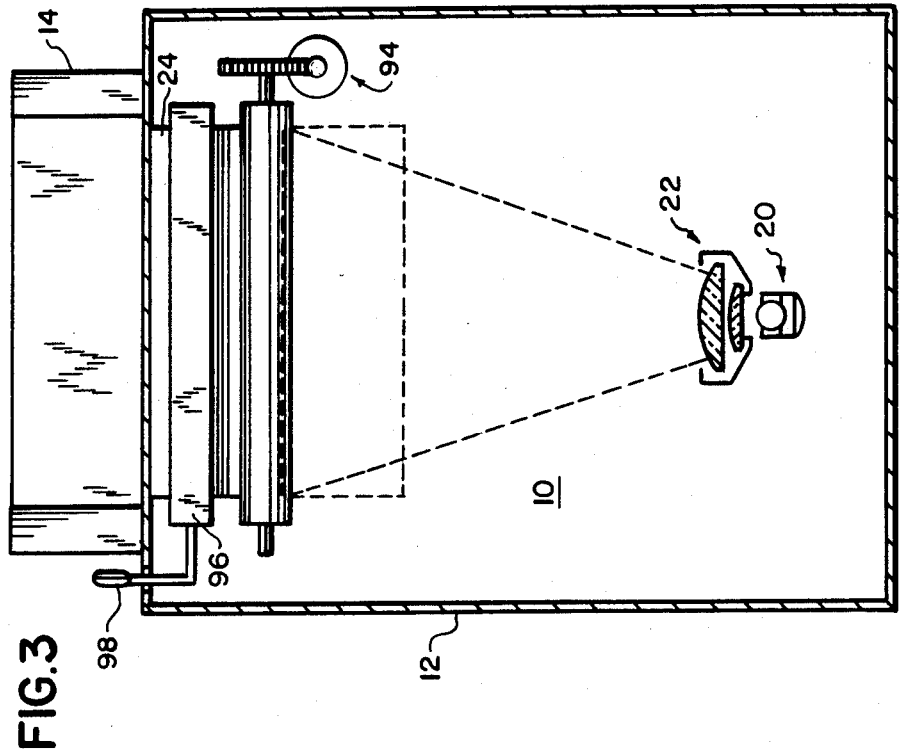
FIG. 3 is a similar depiction, that is another schematic representation as in FIG. 2, but seen from the front.
Figure 2:
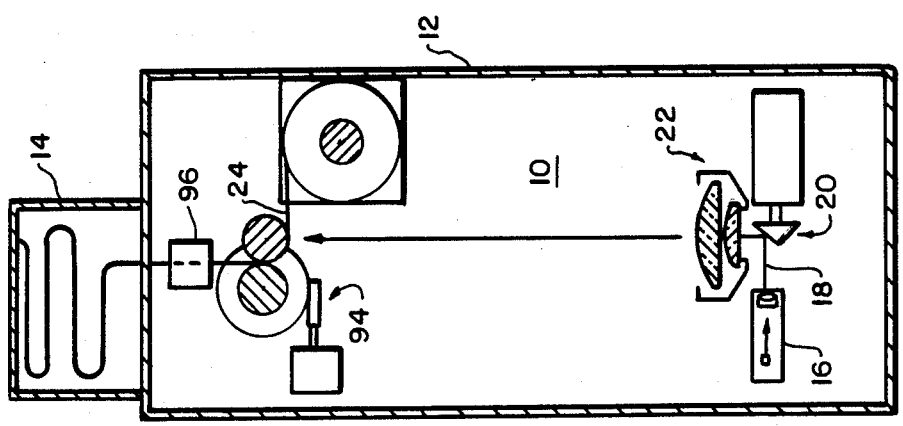
FIG. 2 is a schematic representation of the principal components of the phototypesetting system of the present invention depicted from a side view of the housing of FIG. 1.

Referring to the figures of the drawing and particularly for the moment to FIGS. 1-3, there is shown a perspective view of the complete apparatus; also, schematic diagrams of side and front views of phototypesetting apparatus 10 arranged in accordance with the present invention to provide a two-dimensional image from an electrical representation of such image. The apparatus 10 is contained in a housing 12 at the top of which there is provided a receptacle 14 for receiving the photosensitive material on which images have been set.

Within the housing 12 are contained the primary components seen schematically in FIGS. 2 and 3. These components include a source of light 16 from which there is emitted a modulated beam 18. A rotatable prism mirror reflects the beam 18 to a scan lens 22 through which the beam passes to an image point on the photosensitive material 24.

It is to be especially noted that the rotatable prism mirror 20 is provided with two mirror facets 32 and 34 (FIG. 4), such facets being joined in a common line 30 in accordance with this triangular prism construction. The mirror or spinner 20 is driven by a high speed synchronous motor 36 whose speed is constant on the average but is subject to a limited amount of jitter and wander.

It will be appreciated that as the prism mirror or spinner 20 is rotated, the beam emanating from the scan lens 22 causes a focused spot 38 to move in rasterlike fashion along an image plane of the film 24. The beam angle $\alpha$ that is swept out during imaging by a given mirror facet—i.e., either the facet 32 or the facet 34—is approximately 60°. During this period, information contained in the modulated laser beam is laid down on the film. It will of course be understood that the beam sweep caused by the facet 34 occurs one half a revolution of the mirror 20 later than the beam sweep caused by the facet 32. In between these two active periods there are dead times of approximately 120° each. During these dead times the electronic circuitry of the system switches the scanning beam on so that the beginning sweep can be detected by a photocell 110. Given a prescribed speed of the motor 36, it will be manifest that the scanning time in rastering with the prism mirror or "spinner", according to the invention, is longer by a factor of two when compared with the scanning time for a conventional, polygonal mirror, thereby increasing the dwell time of the beam on the photosensitive film. In the prior systems exemplified by U.S. Pat. No. 4,204,994, only half the angle swept out by a given mirror facet is utilized because of the 2:1 ratio between the angle of rotation and the angle of the scanning beam.

Figure 10:
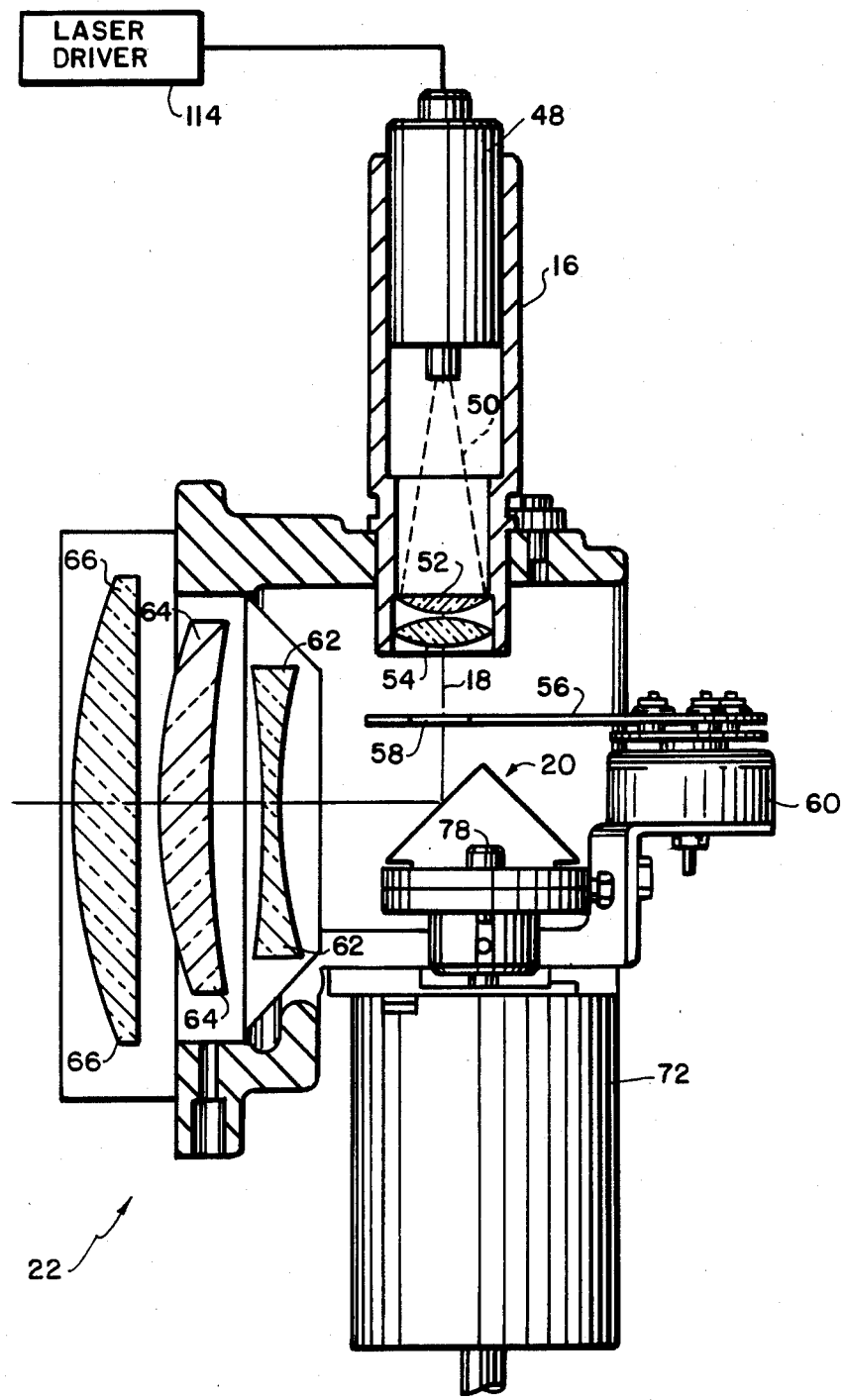
FIG. 10 is a side elevational view of the complete laser scanning system of the present invention.

Referring now to FIG. 10, there will be seen further details of the scanning system in accordance with the preferred embodiment. In this figure it will be noted that the source 16 includes a laser diode 48 housed in a suitable container and providing a source of coherent light 50 which is transmitted through collimator lenses 52 and 54. Depending on the type of light source and beam produced, the collimator may be replaced by other beam controlling means.

A component not mentioned previously is an adjustably rotatable plate 56 (FIG. 11) containing a slotted aperture 58. The plate 56 is rotated by means of a rotary solenoid 60 having a suitable shaft attached to one end of plate 56. This adjustable aperture plate 56 is an optional feature, according to the invention; however, it is useful for tailoring or controlling the spot size and spot shape at the photosensitive sheet material. It will be understood that although a slotted opening 58 is shown, this opening can be round if desired. By use of this aperture plate a nominal 25 micron spot can be enlarged to an elliptical 25 by 50 micron spot at the image point on the photosensitive material (where 25.4 microns=1/1000 inches).

The slotted opening 58 in the aperture plate 56 is oriented such that the long dimension of the elliptical spot on the film plane is arranged vertically with respect to the imaged text or graphics on the photosensitive film. With the aperture in place, the elongated spot will ensure proper fill-in between successive scan lines as the film is advanced with a coarse vertical resolution (e.g., 800 lines per inch or less). When the film is advanced with a fine resolution (up to 2,400 lpi), the aperture plate is removed so that the focused spot remains round and small.

Actuation of the rotary solenoid 60 can take place automatically, in dependence upon the operator's selection of the vertical resolution, or it can be controlled independently by the operator.

The scan lens 22, which preferably is made up of three individual lenses, operates in accordance with the principles described in the aforementioned U.S. Pat. No. 3,687,025 to Rosin. In particular, the scan lens is constructed and arranged to adjust the beam according to the relationship $y' = f \cdot \theta$, where y' is the distance of the image from the intersection of the axis of the scan lens and the image plane, f is the effective focal length of the scan lens to the image plane, and $\theta$ is the angle between the beam and the optical axis of the scan lens. The scan lens 22 focuses the beam onto the photosensitive surface while compensating for any variations in image focus introduced by deviations of the beam from the optical axis.

Because of the fact that the mirror scanner 20 is provided with only two facets, easy adjustment can be made to insure that the scanning beam from both facets will strike the photosensitive material 34 at the same place (along the same line). For this purpose, mounting means are provided which can be seen in detail in FIGS. 5 through 8. The mirror scanner 20 is mounted to be driven at high speed by a motor 36, a hub 74 being provided to lock onto the end of the motor shaft. The mirror scanner 20 is glued onto a base 76 which is integrally formed with the hub 74.

It will be seen by reference to FIG. 5 that two tapered bores 80 extend through the base 76. Two suitably tapered adjusting screws 82 are adapted to be fitted within the bores 80. Movement in and out of these adjusting screws results in appropriate tilting of the mirror scanner 20 with reference to the axis of rotation. Two further screws 78 are provided so as to tightly clamp the screws 82 between the two halves of the base 76, after each repositioning of these screws 82. Consequently, the one degree of freedom adjustment that is necessary with this two faceted mirror scanner can be readily accomplished.

Figure 9:
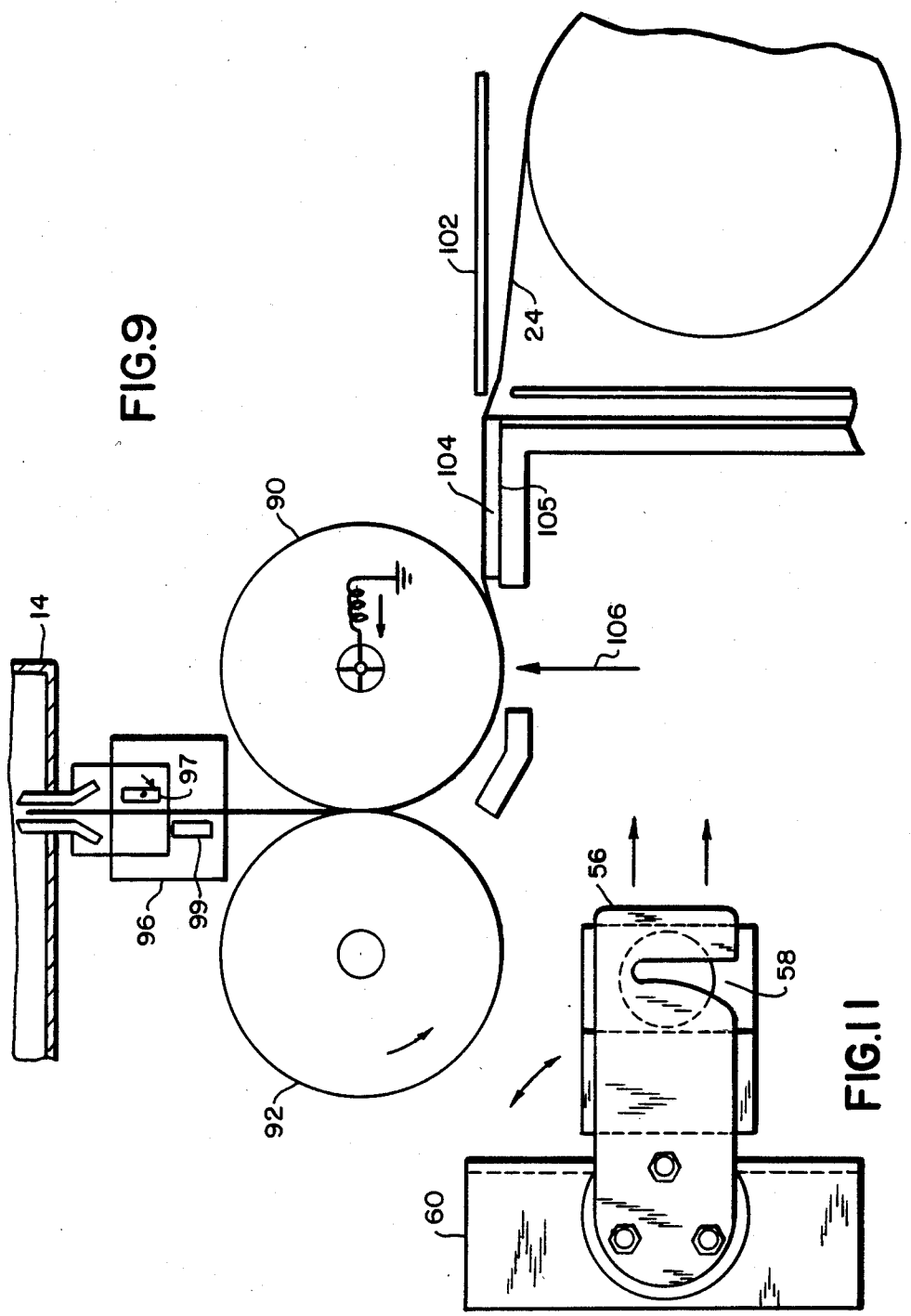
FIG. 9 is an elevational view of the transport mechanism for the photosensitive material on which images are set in accordance with the present invention.

Referring now to FIG. 9 there are shown some further details of the transport mechanism for transporting the photosensitive sheet material or film 24 previously seen in FIGS. 2 and 3. The film 24 is fed to the nip of the pair of rollers 90 and 92, the latter being driven by a motor-worm gear arrangement 94 (FIG. 2). A cutting device 96 already noted is provided for cutting the photosensitive material 24 after it emerges from the rollers, at the conclusion of a typesetting "run". It consists of a rotatable blade 97 or the like, controlled either by a manual lever 98 (FIG. 1) or by a motor, which coacts with a stationary blade 99.

It will be noted that as the film 24 emerges from its housing or receptacle 102, it encounters a piece of velvet 104 suitably mounted on a plane surface 105 slightly offset from the exit of the receptacle 102. It is thus insured that the film will be properly tensioned at the imaging point and wrapped around the pressure roller 90. Because of the characteristics of velvet, the film surface will not be scratched.

From the arrangement depicted in FIG. 9 for the transport mechanism, it will now be appreciated that such mechanism provides an extremely short path for the film 24 as it travels from the receptacle 102 to the receptacle 14. As a result, very little paper is wasted between runs and there is an extremely limited chance of jamming in the course of the travel of the film.

It will be understood that the extremely short path provided is a consequence of the fact that the image point, symbolized by the arrow 106, is focused on one of the rollers; that is, on the pressure roller 90 at the bottom thereof.

In the operation of the image setting apparatus of the present invention certain control electronics are provided, particularly video or scanning controls and stepping controls. Referring now to FIG. 4, it will be seen that the photoelectric detector 110 senses the lateral position of the beam spot 38 on the image plane and provides an electrical pulse to a programmable delay stage 112 and a beam switching circuit 113. The beam switch circuit, in turn, is connected to a laser driver (amplifier) 114 which supplies controlled power to the laser diode.

The beam switching circuit 113 blanks (switches off) the laser diode during the period following receipt of a pulse from the photodetector 110 until the delayed pulse is produced by the delay stage 112. Once the delayed pulse is received, the beam switching circuit switches the laser diode on and off in accordance with the incoming data representative of the images to be produced on the photosensitive film. The beam switching times are synchronized and controlled by a free-running, stable 15 MHz oscillator.

According to still another feature of the present invention, the laser driver 114 is capable of supplying a controlled amount of power to the laser diode, thus permitting variation in the intensity of the beam. In the preferred embodiment, the power may be positioned at any one of eight different levels, these levels being selected during manufacture of the machine from among 256 different potential levels (providing precision).

As in the case of the aperture plate, the power level may be selected automatically upon selection of the vertical resolution by the operator, or can be selected manually, thus overriding the default selection by the machine.

In order to provide the man skilled in the art with a somewhat detailed set of specifications according to which a physical embodiment may be constructed, the following data are provided: The film 24 may be selected to be a silver halide coated film or paper and may be of the type requiring standard processing. In the event that a laser diode is used for the source 16 it is necessary to use infrared sensitive film. Such film is available from Eastman Kodak Co., Rochester, N.Y. under the designation: D2622; Record 40302; 12"×150', Spec. 175.

Vertical stepping resolution can be selected from among eight different levels from a value of 2,400 lines per inch (maximum) to 240 lpi (minimum). A typical vertical stepping rate is 173.6 rasters per second (equivalent to 8.7 inches per minute at 1,200 lpi resolution). The attainable accuracy is ±0.2% cumulative.

The horizontal scanning resolution is selectable by a controller up to 2,400 dpi maximum. For this purpose a 15 MHz internal clock is utilized, the average data rate being 5 MHz for 2,400 dpi resolution, 2.5 MHz for 1,200 dpi, etc. The duty cycle is 33% for full measure. The horizontal scanning measure is 310 mm. maximum with the linearity equal to ±0.5 point.

For extremely fine quality imaging, the operator can also cause the machines to use only one facet of the prism mirror. This avoids any possible loss of quality due to misalignment of the facets.

The spot size for the imaging on the film 24 is 25 microns nominal, with 25×50 microns selectable by means of the adjustable aperture. The spot power is 250 ergs/sq. cm maximum, at the film plane, and selectable from among 256 levels down to 50 ergs/sq. cm minimum. The scanning motor is a reluctance, synchronous motor designed to minimize jitter and wander. A hysteresis synchronous motor can also be used.

What has been described is a unique image setting apparatus that is extremely cost effective, while achieving the required high degree of resolution in image setting. Because of its various features it is suitable not only for the traditional typesetter environment, but can be equally suitable for the computerized office workplace, for technical publications departments, and other developing graphics output requirements.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. Image setting apparatus for producing a two dimensional image on photosensitive sheet material comprising:
   means for transporting such photosensitive sheet material past an image point to provide a first dimension of said two-dimensional image on said photosensitive material;
   a light source for producing a modulated beam of light;
   a rotatable prism, having two mirror facets whose planes intersect in a common line and having its axis of rotation perpendicular to said line, for reflecting said light beam into a scanning beam with a substantially constant angular velocity; and
   scan lens means in the path of said scanning beam such that a focused beam spot moves repeatedly in a linear direction across said photosensitive material at said image point to provide the other dimension of said two-dimensional image on said photosensitive material.

2. Apparatus as defined in claim 1, in which the angle of rotation for said prism mirror is substantially equal to the scanning angle of said scanning beam.

3. Apparatus as defined in claim 1, in which said axis of rotation is parallel to said light beam produced by said light source.

4. Apparatus as defined in claim 1, in which said light source comprises a laser which emits a coherent light beam, and laser driver means coupled to said laser for modulating said laser beam in response to an electrical signal representative of said image.

5. Apparatus as defined in claim 4, in which said laser is a diode for providing light in the infrared range, and said photosensitive material is a film responsive to said infrared light.

6. Apparatus as defined in claim 1, in which said scan lens means is constructed and arranged to adjust said scanning beam according to the relationship $y' = F \cdot \theta$, where y' is the distance of the image from the intersection of the axis of the scan lens and the image plane, f is the effective focal length of the scan lens to the image plane, and $\theta$ is the angle between the collimated beams and the optical axis of the scan lens, thereby to focus said scanning beam onto the photosensitive material while compensating for any variations in image focus introduced by deviation of the focused beam from the optical axis.

7. Apparatus as defined in claim 1, in which a variably positionable aperture is placed in the beam path between said light source and said photosensitive material, thereby to vary the size and shape of said focused beam spot.

8. Apparatus as defined in claim 1, further comprising means for adjusting the mirror mount so that said scanning beam from both facets will strike said photosensitive material along the same line if said photosensitive material is stationary.

9. Image setting apparatus for producing a two-dimensional image on photosensitive sheet material, comprising:
   means for transporting such photosensitive sheet material past an image point to provide a first dimension of said two-dimensional image on said photosensitive material, said means including a pair of parallel, smooth surfaced rollers at the nip of which said sheet material is pinched;
   means for selectively and directly rotating only one of said rollers, the other one of said rollers being rotated indirectly by friction contact of said sheet material with said one roller, said image point being located along a line on the surface of said other one of said rollers and extending parallel to its axis of rotation;
   a light source for producing a modulated beam of light;
   means for converting said light beam into a scanning beam; and
   scan lens means in the path of said scanning beam such that a focused beam spot moves repeatedly in a linear direction across said photosensitive material at said image point to provide the other dimension of said two-dimensional image on said photosensitive material.

10. Apparatus as defined in claim 9, wherein said roller rotating means is a worm gear drive.

11. Apparatus as defined in claim 9, further including a first receptacle for holding the photosensitive sheet material to be transported past said image point, and a second receptacle for receiving the photosensitive sheet material that has been so transported.

12. Apparatus as defined in claim 11, further comprising means, arranged in the path of movement of said photosensitive material between said transporting means and said second receptacle, for cutting said photosensitive material.

13. Apparatus as defined in claim 11, further comprising stationary means, arranged in the path of movement of said photosensitive sheet material between said first receptacle and said transporting means, for resiliently contacting the surface of said photosensitive material to insure proper tension thereof at said image point.

14. The apparatus as defined in claim 13, wherein said contacting means includes a velvet contacting surface.

15. Image setting apparatus for producing a two-dimensional image on photosensitive sheet material, comprising:
- means for transporting such photosensitive sheet material past an image point to provide a first dimension said two-dimensional image on said photosensitive material;
- a light source for producing a modulated beam of light;
- means for converting said light beam into a scanning beam;
- scan lens means located in the path of said scanning beam such that a focused beam spot moves repeatedly in a linear direction across said photosensitive material at said image point to provide the other dimension of said two-dimensional image on said photosensitive material; and
- a variably positionable aperture arranged in the beam path between said light source and said photosensitive material at a location wherein controlled positioning of said aperture in the beam path will vary the size and shape of said focused beam spot.

16. Image setting apparatus for producing a two-dimensional image on photosensitive sheet material, comprising:
- means for transporting such photosensitive sheet material past an image point to provide a variable first dimension of said two-dimensional image on said photosensitive material;
- a controllable light source for producing a modulated beam of light;
- means for converting said light beam into a scanning beam;
- scan lens means located in the path of said scanning beam such that a focused beam spot moves repeatedly in a linear direction across said photosensitive material at said image point to provide successive scan lines, each scan line providing the other dimension of said two-dimensional image on said photosensitive material; and
- means for controlling said light source to adjust the intensity of said light beam when said beam is switched on, so that the amount of energy laid down on the photosensitive material is controlled in accordance with variation of said variable first dimension between successive scan lines.

17. Apparatus as defined in claim 15, further including control means coupled to said variably positionable aperture for controlling the positioning of said aperture in said beam path in response to changes in said first dimension of said two-dimensional image.

* * * * *